United States Patent

Horton

[11] Patent Number: 6,128,300
[45] Date of Patent: Oct. 3, 2000

[54] LINE CARD WITH MODEM INTERACE

[75] Inventor: Fred Horton, Santa Rosa, Calif.

[73] Assignee: Nokia High Speed Access Products Inc., Petaluma, Calif.

[21] Appl. No.: 08/984,419

[22] Filed: Dec. 3, 1997

[51] Int. Cl.[7] .................................................. H04Q 11/00
[52] U.S. Cl. ......................... 370/395; 370/420; 370/463; 379/166
[58] Field of Search ................................... 370/396, 395, 370/400, 401, 402, 419, 420, 430, 359, 463, 465, 466, 474, 522, 525; 375/222; 379/93.05, 93.06, 93.07, 93.09, 166

[56] References Cited

U.S. PATENT DOCUMENTS

| | | | |
|---|---|---|---|
| 4,734,908 | 3/1988 | Hedlund | 370/419 |
| 5,014,306 | 5/1991 | Rodgers et al. | 379/407 |
| 5,283,678 | 2/1994 | Czerwiec | 359/109 |
| 5,515,373 | 5/1996 | Lynch et al. | 370/79 |
| 5,519,700 | 5/1996 | Punj | 370/60.1 |
| 5,568,300 | 10/1996 | Ishibashi | 370/419 |
| 5,768,275 | 6/1998 | Lincoln et al. | 370/419 |
| 5,815,505 | 9/1998 | Mills | 370/522 |

*Primary Examiner*—Ricky Ngo
*Attorney, Agent, or Firm*—Fish & Richardson P.C.

[57] ABSTRACT

An apparatus and methods for communicating data over a voice-band communications loop are disclosed. The apparatus includes transceiver circuitry, a backplane interface, backplane interconnection circuitry, and signaling circuitry. The transceiver circuitry transmits and receives voice-band modulated data over the communications loop. The backplane interface provides for physical interconnection to the backplane. Backplane interconnection circuitry couples the transceiver circuitry and the backplane interface to each other for data transmission to enable the exchange of digital data between the transceiver and the backplane. The signaling circuitry transmits and receives POTS call control signals over the communications loop. A method for receiving voice-band data is disclosed. The method includes establishing a voice-band connection over the communications loop, receiving a voice-band modulated data signal, converting the voice-band modulated data signal to digital data, and transmitting the digital data over a backplane bus. A method of transmitting voice-band data is also disclosed. The method includes establishing a voice-band connection over the communications loop, receiving digital data over a backplane bus, converting the digital data to a voice-band modulated data signal, and transmitting the voice-band modulated data signal over the communications loop.

9 Claims, 6 Drawing Sheets

LINE CARD WITH MODEM INTERACE

BACKGROUND INFORMATION

The present invention relates to a line card with a modem interface.

Digitized data, such as data produced by a computer, can be transmitted over the plain-old telephone service (POTS) voice-band phone network using a modem. Conventional modems use POTS compatible electrical signaling to establishes a voice-band communication channel through a POTS central office switching system to a destination modem. The originating and destination modems exchange digital data by encoding the data as voice-band signals which are transported end-to-end across the telephone network.

Various transmission standards exist to provide POTS-compatible voice-band encoding of digitized data. For example, modems implementing the International Telecommunications Union (ITU) V.34 standard can support 28.8 Kilobit per second (Kbps) voice-band data transmission and modems supporting the K56flex protocol can support transmission at rates of up to 56 Kbps. The maximum data communication rate between the originating and destination modems is determined, among other things, by the supported modem protocol and the end-to-end electrical interference on the communications channel between the modems.

POTS telephone signals, including those exchanged by POTS voice-band compatible modems, typically originate at POTS customer premises equipment (CPE) and are transmitted over a twisted-pair wire loop terminating at a central office POTS line card. A POTS compatible line card provides signal transmission functions such as ringing voltage pulses, CPE power, dual-tone multi-frequency (DTMF) tone detection, and pulse-dialing detection. Conventional POTS line cards typically interface to a central office POTS switching system (a "POTS switch"). The POTS switch establishes a voice-band data connection by routing a POTS call from the originating CPE to terminating CPE. Typically, POTS voice-band signals are converted to a 64 Kbps pulse-code modulated (PCM) data stream allowing voice-band frequencies of up to 3.1 kilohertz to be routed through the POTS network. As with other POTS-compatible services, and regardless of the modem's supported data rate, the voice-band frequencies produced by a modem are typically encoded as a 64 Kbps PCM data stream for routing through the telephone network.

Routing of modem-originated data through a POTS switch requires POTS switch resources to be dedicated to the voice-band channel between the originating and destination modems. For example, a 64 Kbps time-division multiplexed interoffice trunks may be used to provide the voice-band channel.

SUMMARY

In general, in one aspect, the invention features an apparatus for communicating data between a communications loop and a backplane. The apparatus includes transceiver circuitry, a backplane interface, backplane interconnection circuitry, and signaling circuitry. The transceiver circuitry transmits and receives voice-band modulated data over the communications loop. The backplane interface provides for physical interconnection to the backplane. Backplane interconnection circuitry couples the transceiver circuitry and the backplane interface to each other for data transmission and enables the exchange of digital data between the transceiver and the backplane. The signaling circuitry transmits and receives POTS call control signals over the communications loop.

Implementations of the invention may include one or more of the following features. The transceiver circuitry may implemented the V.34 modem protocol. The communications loop may be a two wire loop. POTS call control signals may include a dial tone signal and may include dual-tone multi-frequency (DTMF) signals. The apparatus may also include data cell processing circuitry to receive a data cell from the backplane interconnection circuitry, extract data from the payload field of the received data cell, and send the extracted data to the first transceiver circuitry. Data cell processing circuitry may implements the ATM adaptation layer 5 protocol.

The invention may also include one or more of the following features. The apparatus may include a second transceiver to transmit and receive voice-band modulated data over a second communications loop and exchange digital data with the backplane interconnection circuitry. The apparatus may include data cell processing circuitry coupled to the first and second transceiver circuitry and to the backplane interconnection circuitry to receive a data cell from the backplane interconnection circuitry. The data cell processing circuitry may extract payload data from the data cell, select either the first or the second transceiver, and send the extracted payload data to the selected transceiver circuitry. The data cell processing circuitry may selects the transceiver based on data cell header data.

In general, in another aspect, the invention features a method of receiving data in an apparatus for communicating voice-band data between a communications loop and a backplane. The method includes establishing a voice-band connection over the communications loop, receiving a voice-band modulated data signal, converting the voice-band modulated data signal to digital data, and transmitting the digital data over a backplane bus.

Implementations of the method may include one or more of the following features. Establishing a voice-band connection may include generating a POTS ringing signal and detecting an off-hook signal on the communications loop. Converting the voice-band modulated data signal to digital data may include de-modulating the voice-band data signal to generate digital data and forming data cells wherein the data cell payload includes the generated digital data and the data cell header includes data cell routing data.

In general, in another aspect, the invention features a method of transmitting data in an apparatus for communicating voice-band data between a communications loop and a backplane. The method includes establishing a voice-band connection over the communications loop, receiving digital data over the backplane bus, converting the digital data to a voice-band modulated data signal, and transmitting the voice-band modulated data signal over the communications loop. In various implementations, receiving digital data may include receiving a data cell and converting digital data may include converting data cell payload data into a voice-band modulated data signal.

The disclosed apparatus provides for improved transport of data between a modem and a data network.

DETAILED DESCRIPTION

Figure 1:
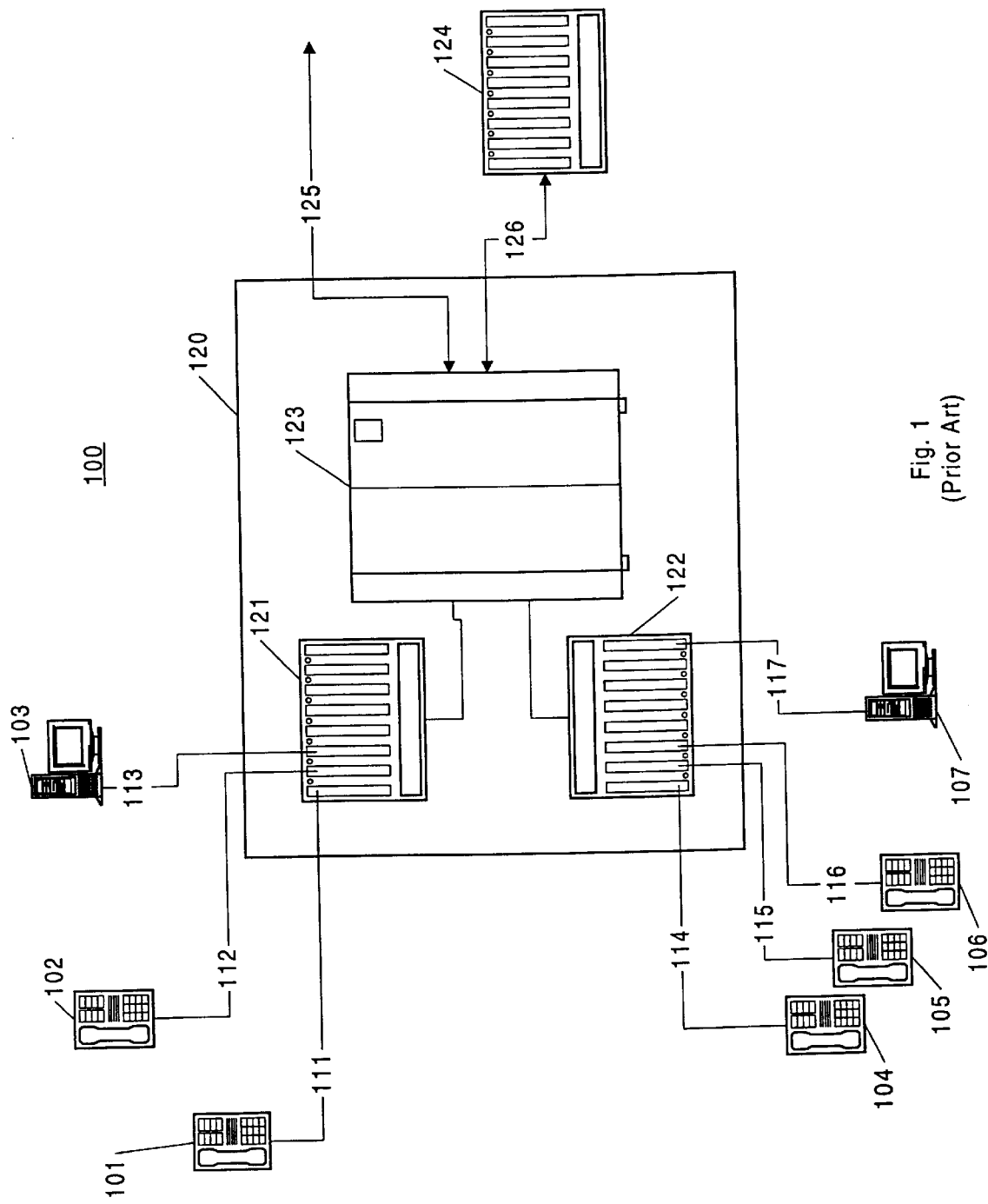
FIG. 1 is a POTS voice-band phone network.

FIG. 1 illustrates an exemplary POTS voice-band phone network. In the POTS network 100, voice-band POTS signals are exchanged between customer premise equipment (CPE) 101–107 and a telephone company central office 120. The central office 120 includes line card shelves 121–122. Line card shelves 121–122 house POTS line cards to generate and terminate POTS signals exchanged over the POTS loops 111–117. Line card shelves 121–122 are coupled to a central office POTS switch 123. The central office POTS switch 123 provides for routing of POTS calls within the central office 120 and to remote switching equipment by trunks 125 and 126. Trunks 125 and 126 couple the central office switch 123 to remote switching equipment and are, for example, standard telephony 1.5 Megabit per second (Mbps) T1 trunks.

To provide POTS voice-band signaling and transport between the CPE 101–107 and central office 120, line card shelves 121 and 122 include line cards that convert the POTS voice-band analog signals to a form compatible with the central office switch 123. In a central office 120 having a digital POTS switch, such as a Lucent Technology 5ESS switch, analog POTS signals are exchanged between POTS CPE 101–107 and the line cards in shelves 121 and 122 while a 64 kilobit per second (Kbps) pulse code modulated (PCM) data stream is exchanged between the line cards in shelves 121 and 122 and the POTS switch 123. Standard 64 Kbps PCM signal encoding can, in theory, supports voice-band analog signals having a frequency of up to 4 kilohertz (KHz). In typical implementations, however, line card signal filtering and signal conversions attenuates frequencies above 3.1 KHz.

Data can be transmitted through a POTS voice-band network using a personal computer 103 and 107 having a modem. The modem may support the V.34, K56flex, or other data protocol. A modem allows a data-over-POTS call to be established wherein data is transported from the CPE modem through the POTS voice band network using standard POTS signaling and voice call routing by the POTS switch 123. Central office equipment 121–123 may route the data-over-POTS call between, for example, computer 103 and computer 107, or may route the data-over-POTS call from a personal computer 103 through the line card shelf 121 and central office switch 123 to a terminating modem 124 at, for example, an Internet service provider point of presence (POP) or other data service provider point of presence.

Routing of modem-originated data through a POTS switch requires POTS switch resources to be dedicated to the voice-band channel between the originating and destination modems. The POTS voice-band connection is typically supported by a 64 Kbps PCM data channel regardless of the modem's data rate. Furthermore, use of standard POTS line cards coupled to loops 111–117 may limit the efficiency of modem transmission.

Figure 2:
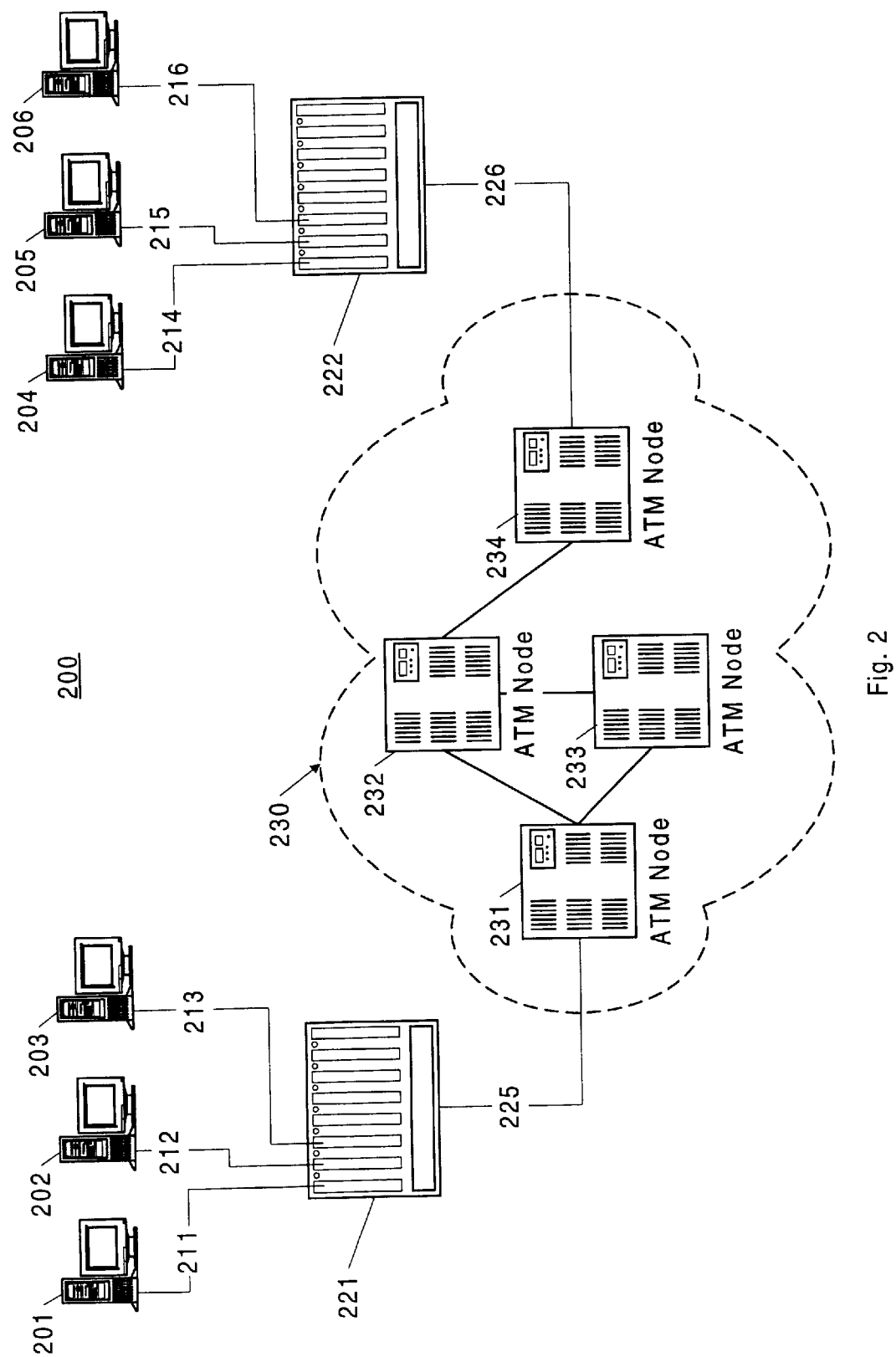
FIG. 2 is a communications network in accordance with the invention.

FIG. 2 illustrates a communications network. In the communications network 200, POTS voice-band data is sent between a modem 201–208 and a line card in a line card shelf 221 and 222 over a twisted-pair wire loop 211–216. The line cards in the line card shelves 221 and 222 include modem capabilities to convert POTS voice-band data signals directly to digital data. The converted digital data may be in the form of fixed-size asynchronous transfer mode (ATM) cells that can be routed through interconnected ATM switches 231–234 in an ATM network 230. Alternatively, the converted data may be routed through a packet data network, a fixed bandwidth data network, or other digital data network.

Figure 3:
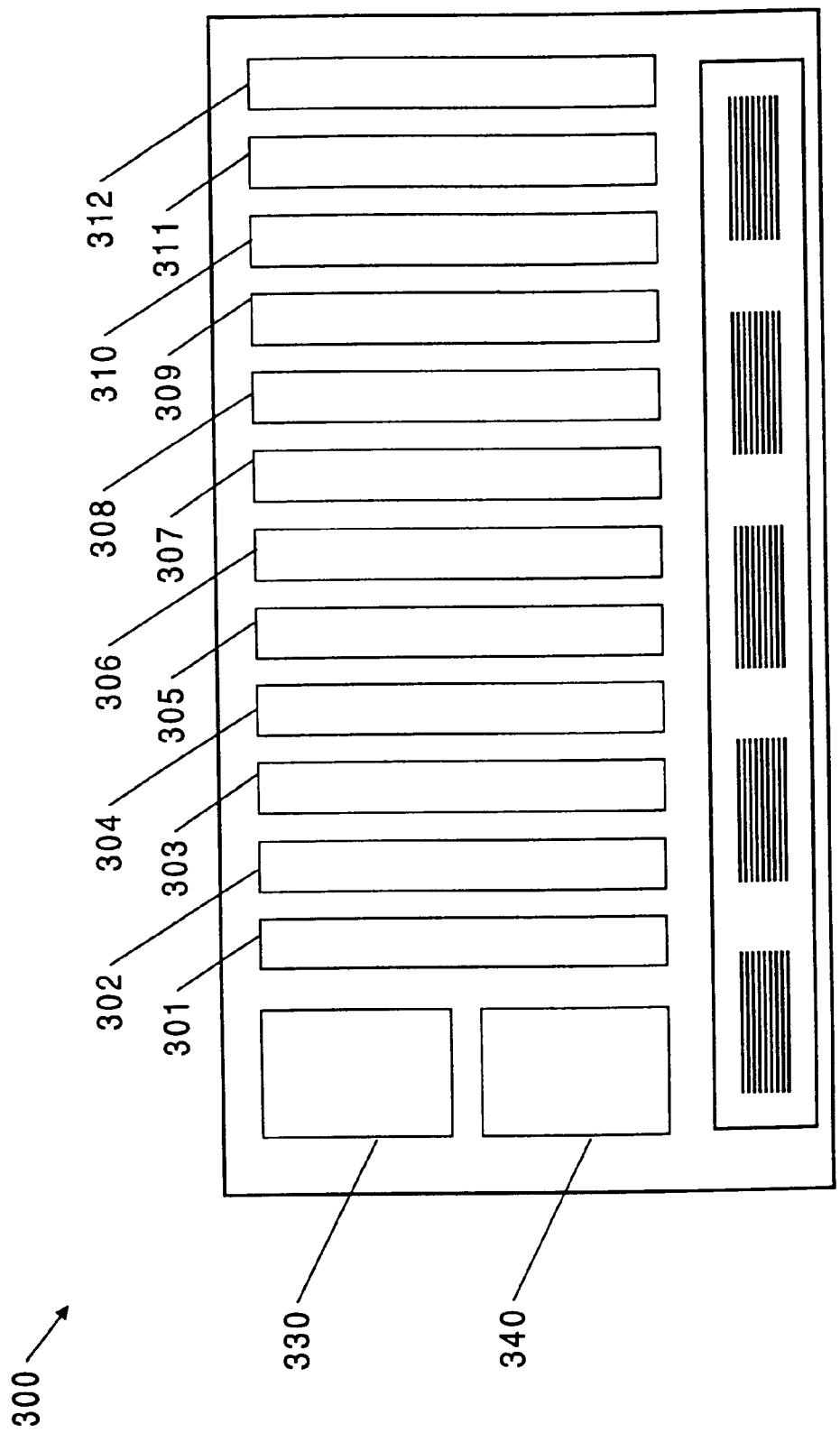
FIG. 3 is a line card shelf in accordance with the invention.

FIG. 3 illustrates a line card shelf 300 having twelve line cards 301–312. Each line cards 301–312 terminates four twisted-pair loop connections and includes modem transceivers supporting, for example, the V.34, K56flex, or other modem protocol. A line card shelf 300 may also includes a multiplexer card 330 and a trunk interface card 340. The multiplexer card 330 routes data between the multiple line cards 301–312 and the runk card 340. The trunk card 340 provides an interface between the line card shelf and, for example, an ATM data source such as an ATM switch 231 or 234 (FIG. 2), a computer system, a local area network, or other data network. The trunk interface is, for example, a standard telephony synchronous optical network level 3 concatenated (SONET OC-3c) interface, a T3 interface, or an Ethernet interface. Line cards 301–312, multiplexer card 330, and trunk interface card 340 are coupled over conductive signal paths on a line card shelf backplane.

Figure 4:
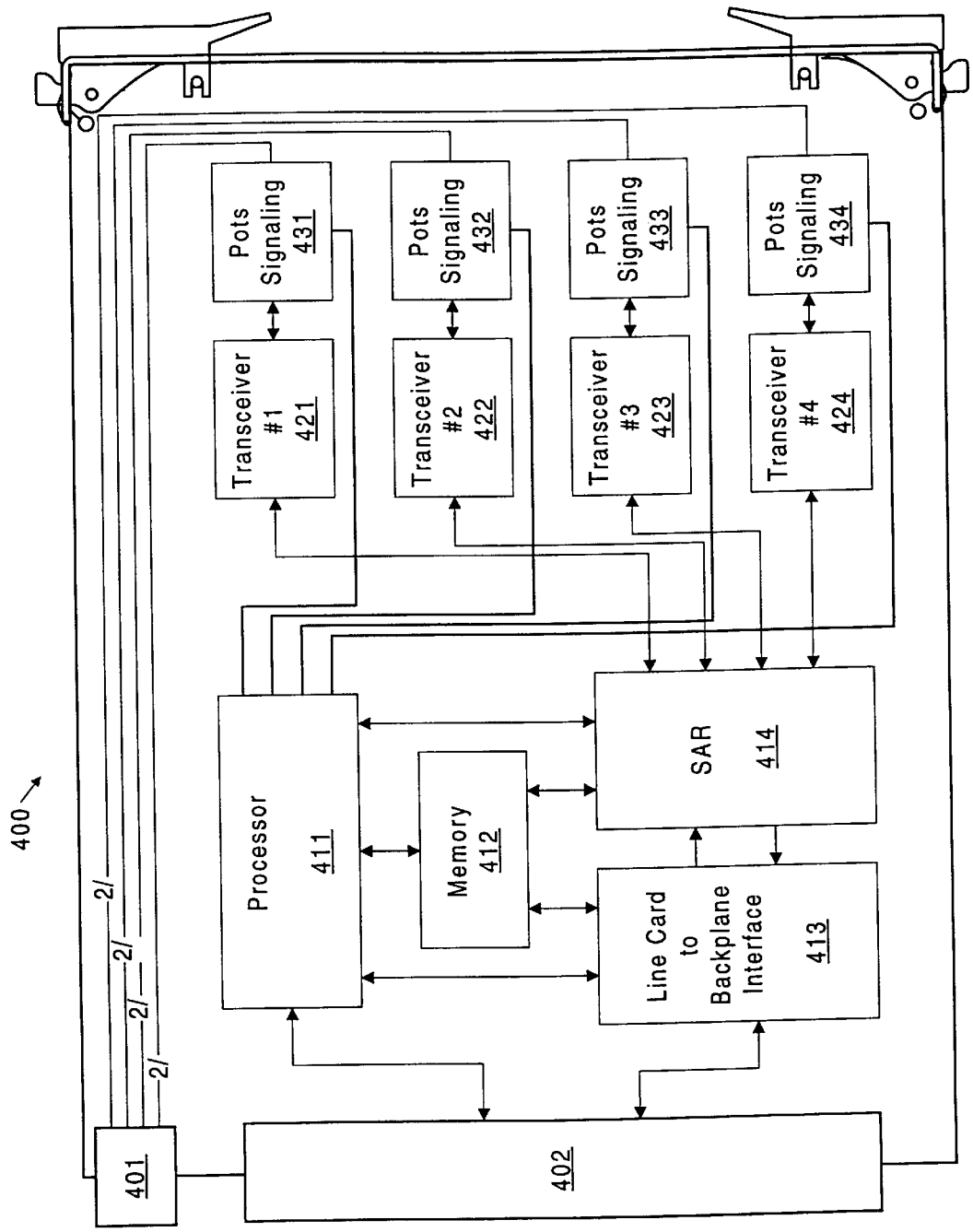
FIG. 4 is a functional diagram of a line card in accordance with the invention.

FIG. 4 illustrates a line card in accordance with the invention. The line card 400 includes POTS call-control and signaling circuitry 431–434 to process incoming POTS call request and includes transceiver circuitry 421–424 to terminate up to four voice-band modem connections. Additionally, the line card 400 includes circuitry to convert voice-band modulated data to asynchronous transfer mode (ATM) cells. ATM cells are fixed-size packets of data that can be multiplexed over a communications path and can be routed by ATM switching nodes ("ATM switches") 231–234 (FIG. 2). ATM switches are circuit oriented, low-overhead packet switches using virtual channels to provide switching and multiplexed data transmission. Asynchronous time division (ATD) and fast packet switching are alternate terms which have been employed to describe similar transfer technologies.

ATM switches and networks transfer information using a data cell format that typically conforms to one of the ATM cell formats adopted by the International Telecommunications Union (ITU). ITU-standard ATM cells have a 5-byte header field and a 48-byte payload field. The header field carries information pertaining to the transport and routing of an ATM cell through ATM switching equipment in a communications network. The payload field is available to transfer data originating at or destined to a modem.

Figure 5A:
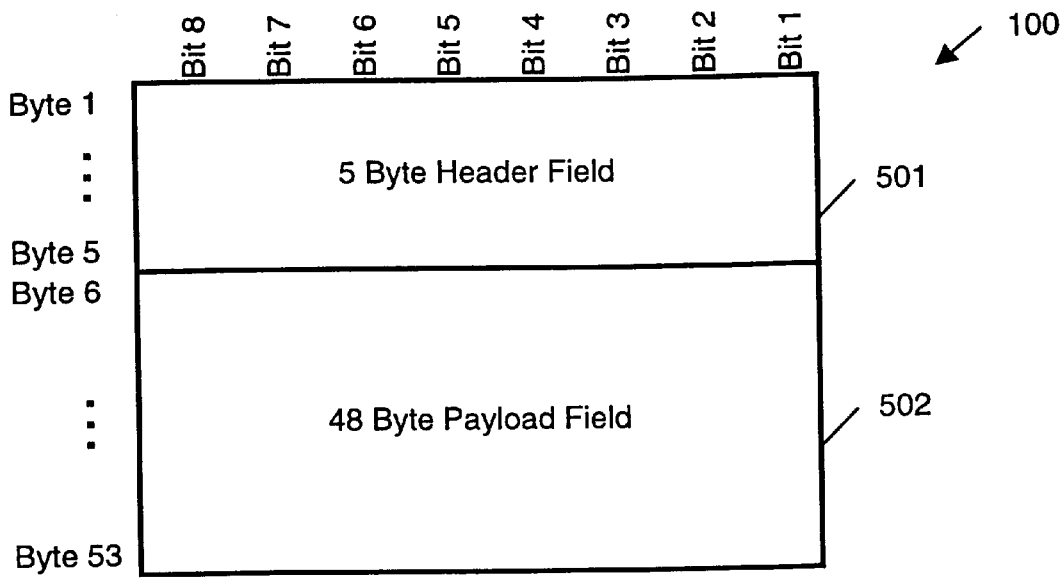
FIGS. 5A, 5B, and 5C illustrate standard ATM cell fields.
Figure 5B:
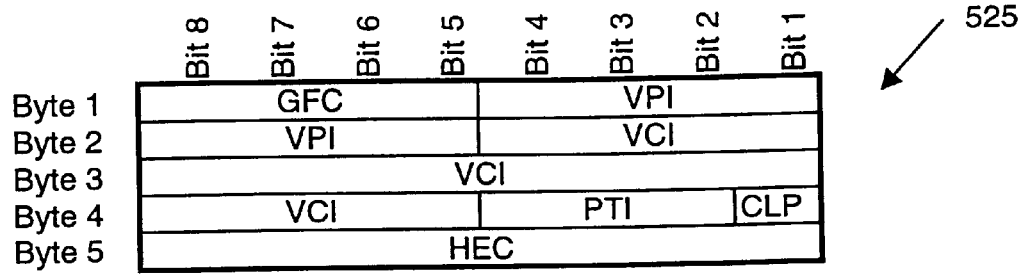
Figure 5C:
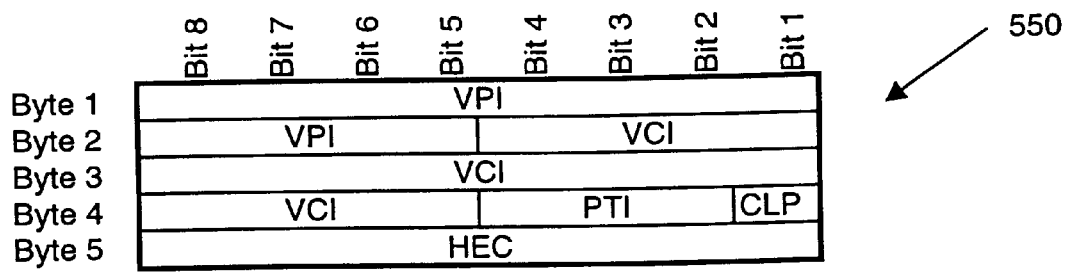

FIG. 5A illustrates an ATM cell having a 53-byte format as defined by the ITU. The ATM cell 500 includes a header field 501 and a payload field 502. An ITU-standard header field 501 may be either a user-network interface header 525 (FIG. 5B) or a network-network interface header 550 (FIG. 5C). A user-network header 525 (FIG. 5B) and a network-network interface header 550 (FIG. 5C) each includes virtual path identifier (VPI) field and a virtual channel identifier (VCI) field. The VPI and VCI field include information used to route the ATM cell through an ATM netvork. Additional information on the VPI and VCI header fields, and on the GFC, PTI, CLP, HEC header fields can be found in *ATM User-Network Interface Specification Version* 3.1, ATM Forum, 1994.

Referring again to FIG. 4, the line card 400 includes transceiver circuitry 421–424. coupled, respectively, through POTS signaling circuitry 431–434 to a communications loop. Each communications loop is, for example, a twisted pair loop 211–216 (FIG. 2) over which modulated voice-band data signals may be transmitted. POTS signaling circuitry 431–434 generates POTS call control signals such as ringing signals and dial tone, and receives POTS signals such as the POTS off-hook indicator signal and dual-tone multi-frequency (DTMF) dialed digits. Processor 411 is coupled to the POTS signal circuitry 431–434 to control POTS signal generation and to process POTS signals received from modem CPE by the line card. POTS signals Transceivers 421–424 are coupled to the POTS circuitry 431–434 to exchange modulated voice-band signals over communications loops. The transceivers extract a digital data stream from the modem-originated modulated voice band signals and send the digital data stream to segmentation and reassembly (SAR) circuitry 414. The segmentation and reassembly (SAR) circuitry 414 converts the received incoming data into ATM cells. Conversion to ATM cells may be done using standard ATM adaptation layer 5 services (AAL-5). AAL-5 and other AAL data conversion services are defined in Bellcore publication GR-1113-CORE, *Asynchronous Transfer Mode and ATM Adaptation Layer (AAL) Protocols*, 1994. SAR circuitry 414 may be a general purpose microprocessor programmed to implement AAL-5 or other adaptation layer protocol. Alternatively, SAR circuit functions may be performed by processor 411 or may be implemented in special purpose circuitry.

SAR circuitry 414 converts the data received by transceivers 421–424 to ATM cells by placing the received data into the payload field of an ATM cell and adding an ATM cell header to the data. The ATM cell header includes data to identify the line card transceiver 421–424 that transferred the data to the SAR circuitry. For example, to identify the line card transceiver 421–424 associated with a particular data cell, the SAR circuitry 414 assigns unique VPI/VCI values to each transceivers. For example, the SAR circuitry may store four unique VPIFVCI values in memory 412 and associate each transceivers 421–424 with a differing one of these four unique VPI/VCI values. In alternative embodiments, a unique incoming data VPI/VCI values and a differing unique outgoing data VPI/VCI value may be associated with each transceiver. Assignment of VPI/VCI values and other header data may be controlled by the line card processor 411 or may be controlled by an network management processor that communicates operations, administration, maintenance, and provisioning (OAMP) data to the processor 411 over the line card shelf backplane. In various implementations, the ATM cell header may be an ITU-standard network-network header, a user-network header, or may be a non-standard header.

ATM cells assembled by SAR circuitry 414 are sent to backplane interface circuitry 413. The backplane interface circuitry 413 controls transmission of data from the line card over the line card shelf backplane to a line card shelf multiplexer or other line card shelf component. The interface circuitry 413 includes, for example, ATM cell buffering, bus signaling, and bus arbitration functions. Bus interface circuitry 413 implements, for example, a CompactPCI™ bus interface, a VMEbus™ interface, or a bus interface as defined in copending application Transmission of ATM Cells filed on Nov. 24, 1997, and incorporated herein by reference. Bus interface circuitry 413 is coupled to a physical interface connection 402 providing electrical coupling to electrical signal paths on a line card shelf backplane.

The line card receives ATM data cells from a line card shelf multiplexer 330 (FIG. 3) or other line card shelf component and converts the data cells to modulated voice-band POTS data signals for transmission to CPE modems.

Line card backplane interface circuitry 413 receives the ATM cells from the line card shelf multiplexer 330 or other line card shelf component and may buffer the received ATM cells prior to sending the cells to SAR circuitry 414. SAR circuitry 414 determines an appropriate transceiver 421–424 based on ATM header data, such as VPI/VCI data, extracts the outgoing data from the ATM cell payload, and sends the outgoing data to the determined destination transceivers 421–424 for transmission over a communications loop to a modem. In various implementations, data exchanged between the SAR circuitry 414, transceiver circuitry 421–424 and the CPE modems may remain in ATM cell format for transmission to a CPE modem or may be converted to a serial data stream. Buffering functionality may be implemented in transceiver circuitry 421–424 or SAR circuitry 414 to regulates data flow by the transceivers 421–424 and to maintain an transmission bit rate compatible with the CPE modem. For example, serial data start and stop bits may be exchanged with the CPE modem to indicate when valid data is being sent. SAR circuitry may include functionality to generate data start and stop bits to properly regulate the flow of data from the line card to CPE modems. For example, a data stop bit may be sent to the CPE modem if there is no data to be sent from the line card to the CPE modem.

Line card circuitry, such as processor 411, may implement high-level protocol functions to facilitate data transfer over the line card to CPE modem link. For example, the line card may, in various embodiments, include support for communications protocols such as the point-to-point protocol (PPP), serial line interface protocol (SLIP), network control protocol (NCP), internet protocol (IP), internet protocol control protocol (IPCP), password authentication protocol (PAP), and the challenge handshake authentication protocol (CHAP). The line card may include a backplane interface to a line card shelf control processor or other processing element to enable processing of these protocols. In still other implementations, the line card may encapsulate data originating at the CPE and provide that data over an ATM network to a server where various communication protocols may be processed.

Figure 6:
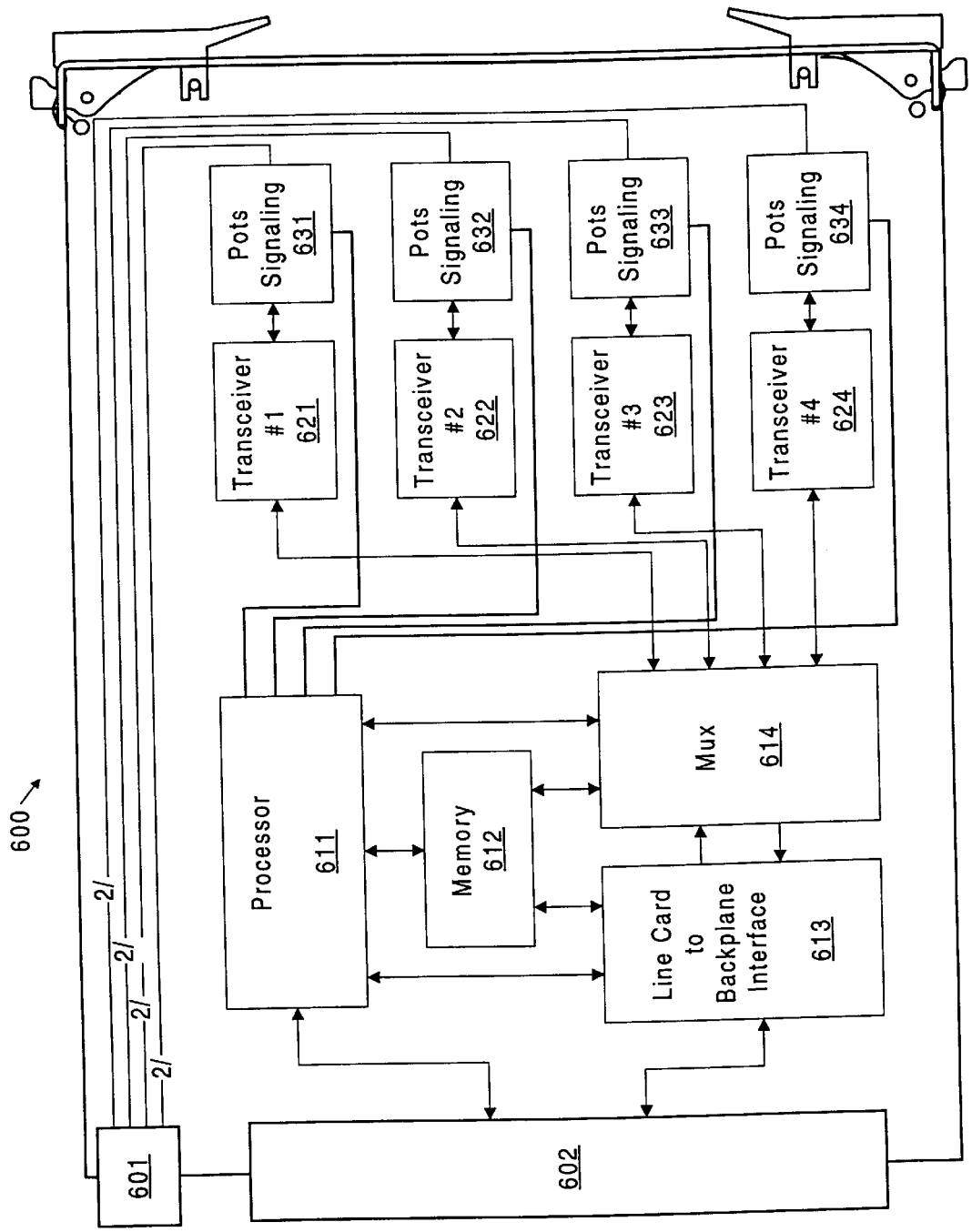
FIG. 6 is a functional diagram of a line card in accordance with the invention.

In various implementations, a line card including modem transceivers and POTS signaling may have a non-ATM interface to a line card shelf backplane. FIG. 6 illustrates a line card in accordance with the invention. Referring to FIGS. 4 and 6, the line card 600 includes transceiver circuitry 621–624, POTS signaling circuitry 631–634, processor 611, memory 612, backplane interface circuitry 613 and backplane interfaces 601 and 602. Line card elements 621–624, 631–634, 611–613 and 601–602 corresponding, respectively, to line card 400 transceiver circuitry 421–424, POTS signaling circuitry 431–434, processor 411, memory 412, backplane interface circuitry 413 and backplane interfaces 401 and 402.

Line card 600 includes multiplexing circuitry 614 coupled to transceivers 621–624 and to backplane interface circuitry 613. Multiplexing circuitry 614 receives data from transceivers 621–624 and provides the data to backplane interface circuitry 613 for transmission over a line card shelf backplane. Multiplexing circuitry 614 may assemble data from transceivers 621–624 into variable length packets or may associate data from each transceiver 621–624 with one or more time slots in a time division multiplexed data stream. Still other couplings between transceivers, line card circuitry, and the backplane interface circuitry are possible.

Line cards in accordance with this invention modulate digital data into a voice-band signal and transmit the voice-band signal over a communications loop. In various implementations, voice-band signal filtering that may be performed conventional POTS line cards can be eliminated. Elimination of signal filtering at the line card may improve data transmission performance by allowing a wider bandwidth signal to be transmitted and received over the POTS loop.

The foregoing descriptions are illustrative. In alternative implementations, a line card may be constructed with more than four modem transceivers or fewer than four transceivers. Line card circuitry may be implemented in one or more integrated circuit chips and may include discrete circuit components.

In various implementations, either ITU-standard 53-byte ATM cells, non-standard ATM cells, or both ITU-standard and non-standard ATM cells may be sent from the line card over the backplane interface. For example, a non-standard 54-byte cell may be formed by adding an additional parity byte to a standard 53-byte cell. This additional parity byte may provide for a parity check of the preceding 53 bytes ITU-standard ATM cell. Such a 54 byte cell may be sent, for example, between the line card and the line shelf multiplexer. In other implementations, a line card in accordance with the invention may include non-ATM interfaces to the backplane. Furthermore, a line card and line card shelf may include additional interfaces to, for example, line card shelf control components and network management systems.

In various embodiments, line card transceivers may include four-wire to two-wire hybrid functionality to couple POTS transmit and receive signals to a two wire communications loop, or may provide separate a separate transmit wire pair and receive wire pair suitable for coupling to an external four-wire to two-wire hybrid interface.

Still other embodiments are within the scope of the following claims.

What is claimed is:

1. An apparatus for communicating data between a communications loop and a backplane, comprising:

a first transceiver circuitry operative to transmit and receive voice-band modulated data over the communications loop;

a backplane interface configured to provide physical interconnection to the backplane;

a backplane interconnection circuitry operatively coupling the first transceiver circuitry and the backplane interface to each other for data transmission, the interconnection circuitry being operable to receive digital data from the first transceiver circuitry and transmit the digital data over the backplane, and to receive digital data from the backplane and provide it to the first transceiver circuitry for transmission over the communications loop;

a signaling circuitry operative to transmit and receive POTS call control signals over the communications loop; and a data cell processing circuitry coupled to the first transceiver circuitry and to the backplane interconnection circuitry, the data cell processing circuitry operative to receive a data cell from the backplane interconnection circuitry, extract data from the payload field of the received data cell, and send the extracted data to the first transceiver circuitry.

2. The apparatus of claim 1 wherein the transceiver circuitry implements the V.34 modem protocol.

3. The apparatus of claim 1 wherein the communications loop comprises a two wire loop.

4. The apparatus of claim 1 wherein POTS call control signals comprise a dial tone signal.

5. The apparatus of claim 1 wherein POTS call control signals comprise a dual-tone multi-frequency (DTMF) signal.

6. The apparatus of claim 1 wherein the data cell processing circuitry implements the ATM adaptation layer 5 protocol.

7. The apparatus of claim 1 further comprising:

second transceiver circuitry operative to transmit and receive voice-band modulated data over a second communications loop, and wherein the backplane interconnection circuitry is operable to receive digital data from the second transceiver circuitry and transmit the digital data over the backplane, and to receive digital data from the backplane and provide it to the second transceiver circuitry for transmission over the second communications loop.

8. The apparatus of claim 7 wherein the data cell processing circuitry further comprises circuitry coupled to the second transceiver circuitry and operative to receive a data cell from the backplane interconnection circuitry, extract payload data from the data cell, select either the first or the second transceiver circuitry, and send the extracted payload data to the selected transceiver circuitry.

9. The apparatus of claim 8 wherein the data cell processing circuitry selects either the first or the second transceiver circuitry based on data cell header data.

* * * * *